US007817093B2

(12) United States Patent
Agata et al.

(10) Patent No.: US 7,817,093 B2
(45) Date of Patent: Oct. 19, 2010

(54) PORTABLE COMPUTER AND ANTENNA DISTANCE SETTING MECHANISM

(75) Inventors: Hiroaki Agata, Yokohama (JP); Mitsuo Horiuchi, Sagamihara (JP); Hirohide Komiyama, Zama (JP); Shigeki Mori, Yamato (JP); Tetsuya Ohtani, Yokohama (JP); Osamu Yamamoto, Yamato (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 335 days.

(21) Appl. No.: 12/058,398

(22) Filed: Mar. 28, 2008

(65) Prior Publication Data

US 2008/0238788 A1 Oct. 2, 2008

(30) Foreign Application Priority Data

Mar. 28, 2007 (JP) ............................ 2007-083667

(51) Int. Cl.
*H01Q 1/24* (2006.01)
*H01Q 1/42* (2006.01)
*G06F 1/16* (2006.01)

(52) U.S. Cl. ................. 343/702; 343/872; 361/679.55; 361/679.01

(58) Field of Classification Search ....................... None
See application file for complete search history.

(56) References Cited

U.S. PATENT DOCUMENTS 5,973,645 A * 10/1999 Zigler et al. ................ 343/702
6,421,011 B1 * 7/2002 Van Egmond et al. . 343/700 MS
6,839,034 B2 * 1/2005 Shimura ..................... 343/702
7,321,337 B2 * 1/2008 Ikeda et al. ................. 343/718
7,423,867 B2 * 9/2008 Yamamoto et al. ..... 361/679.32
7,499,000 B2 * 3/2009 Chan et al. .................. 343/872
7,592,960 B2 * 9/2009 Byrne et al. ................ 343/713

FOREIGN PATENT DOCUMENTS

JP 2002-149273 5/2002
JP 2003-202938 7/2003
JP 2004-280331 10/2004

* cited by examiner

*Primary Examiner*—Trinh V Dinh
(74) *Attorney, Agent, or Firm*—Ference & Associates LLP

(57) ABSTRACT

An apparatus has an antenna distance setting mechanism that sets a distance between a cosmetic cover and a radio antenna. An upper housing and a radio antenna, which has a ground and a radiating element and is movably attached to the upper housing, are covered by a cosmetic cover formed of a dielectric material. An antenna distance setting mechanism includes a radio antenna supporting member, elastic members, and protrusions. The radio antenna-supporting member is movably attached to the upper housing. When the cosmetic cover is attached to the upper housing, an inner wall of the cosmetic cover pushes the ends of the protrusions against an elastic force of the elastic members to set the distance between the radiating element and the inner wall of the cosmetic cover to a predetermined distance.

20 Claims, 4 Drawing Sheets

PORTABLE COMPUTER AND ANTENNA DISTANCE SETTING MECHANISM

CLAIM FOR PRIORITY

This application claims priority from Japanese Patent Application No. 2007-083667, filed Mar. 28, 2007, and which is hereby incorporated by reference as if fully set forth herein.

FIELD OF THE INVENTION

The present invention generally relates to a technique for keeping characteristics of a radio antenna built in a portable computer satisfactory and, more particularly, to a technique for maintaining a distance between a radio antenna and a dielectric material at a predetermined value.

BACKGROUND OF THE INVENTION

As a wireless LAN (local area network) and a wireless WAN (wide area network) have come into wide use, a large number of notebook computers (hereinafter, referred to as 'notebook PCs') recently sold have radio antennas for wireless communication built in as standard. The radio antennas are arranged at an upper side and a vertical side of a liquid crystal display such that the most satisfactory communication can be performed in a general position when a user operates the notebook PC. A plurality of antennas, for example, four or five antennas may be mounted in one notebook PC in order to meet a communication system in which a plurality of antennas are used, such as a diversity communication or an MIMO (multiple input multiple output) communication, or to meet a plurality of communication standards, such as a wireless LAN and a wireless WAN. Furthermore, in this specification, the housing which accommodates a liquid crystal display of a notebook PC therein is hereinafter referred to as a display-side housing, and a housing which accommodates therein main system elements constituting computers, such as a CPU, a mother board, and a hard disk, is hereinafter referred to as a main housing.

The electrical conductivity of a synthetic resin is very low. Accordingly, the wireless communication can be performed even if a radio antenna is covered with a housing formed of synthetic resin. In an early-stage notebook PC, a display-side housing was manufactured by using a rigid synthetic resin, and the radio antenna was attached to an inner wall of the housing. Then, in order to meet a request of a decrease in weight and thickness, the display-side housing came to be manufactured by using metal having high conductivity. For this reason, a structure in which a radio antenna is arranged at a portion where a part of a housing is cut out and a surface of the radio antenna is covered by a cap formed of a synthetic resin due to a request in terms of design and for safety has been adopted.

Known techniques regarding a structure in which a radio antenna is mounted in a display-side housing of a notebook PC are as follows. Japanese Unexamined Patent Publication No. 2002-149273, teaches a notebook PC which allows a radio antenna and a wireless module to be replaced when a part of a housing is detached. Japanese Unexamined Patent Publication No. 2003-202938, teaches a housing of a notebook PC in which a radio antenna is attached to an outer side surface of a display-side housing formed of metal and a side cover formed of a material having low conductivity is attached so as to cover the radio antenna. Japanese Unexamined Patent Publication No. 2004-280331, teaches a housing of a notebook PC in which a radio antenna is fixed in a shape protruding from a metal case, the periphery of the radio antenna is covered by a cover formed of a material having low conductivity, and a radio antenna portion is maintained in a shape spaced apart from an inner surface of the surrounding housing.

In a radio antenna, a gain or a resonance frequency changes due to an influence of a dielectric constant of a surrounding environment. Accordingly, a radio antenna used in the environment where a dielectric material is present in the neighborhood is manufactured in a condition, in which a distance up to the dielectric material when the radio antenna is used is set beforehand, such that a predetermined gain or resonance frequency can be obtained at the set distance. In this specification, a distance between a radiating element of a radio antenna and a dielectric material located near the radio antenna is hereinafter referred to as a set distance. When a display-side housing is manufactured using a synthetic resin which is a dielectric material, a radio antenna regularly functions even if the radio antenna is arranged inside a housing, but a predetermined gain may not be acquired or a resonance frequency may shift if a distance between the radio antenna and an inner wall of the housing deviates from the set distance. Accordingly, in the case that a surface of a radio antenna is covered by a dielectric material, it is necessary to maintain a set distance when the radio antenna is actually attached to a notebook PC.

In accordance with a known method of attaching a radio antenna to a display-side housing, a distance between an inner wall of the housing and a radio antenna is very short and is a fixed value. Therefore, the antenna characteristics intended when manufacturing the antenna can be obtained by setting the set distance to a distance between the radio antenna and the inner wall when the radio antenna is attached to the inner wall. Even in case where the display-side housing is manufactured using metal, the set distance can be realized when the radio antenna is actually attached to the notebook PC by causing a cap and the radio antenna to come in contact with each other.

In Japanese Patent Application No. 2007-69947, a new structure of a display-side housing, which is different from the known structure of the display-side housing formed of a rigid synthetic resin or metal, is proposed. In this structure, a function of the known display-side housing is divided into a strength function and a cover function, such that the strength function is assigned to an upper housing formed of metal and the cover function is assigned to a cosmetic cover formed of a synthetic resin. By adopting such a structure, a notebook PC may be further reduced in thickness and in weight. However, since a radio antenna needs to be arranged inside a cosmetic cover in terms of design, a study of attaching the radio antenna is required to secure the set distance.

For example, a method in which a radio antenna is attached to an inner wall of a cosmetic cover and then the cosmetic cover is attached to an upper housing may be considered. According to the method, a distance between the radio antenna and the cosmetic cover may be easily set to the set distance, but it takes time for wiring and connection of cables which run from the radio antenna attached to the cosmetic cover to a wireless module inside the housing. Although such housing structure is advantageous in that a user can detach a cosmetic cover in order to replace the cosmetic cover with one having a color or design that the user likes, the advantage might not be achieved if the radio antenna is attached to the cosmetic cover. In addition, it also takes time when disassembly and reassembly of the housing are performed as maintenance of a notebook PC.

As another method, a method in which a radio antenna is attached to an upper housing and a portion of a cosmetic cover corresponding to the radio antenna is cut out to secure transmission of an electric wave may be considered. In this case, since a problem related to safety or design remains if a radio antenna is exposed outside the housing, a cover is made using a cap formed of a dielectric material. For this reason, a study of maintaining a distance between a dielectric material and a radio antenna at a set distance is needed, and the strength of a cosmetic cover is decreased to deteriorate in terms of design.

Therefore a need has arisen to address the above-described shortcomings.

SUMMARY OF THE INVENTION

At least one aspect of the present invention provides a an apparatus capable of maintaining a performance of a radio antenna covered by a cover formed of a dielectric material. In addition, at least one aspect of the present invention provides an antenna distance setting mechanism that sets a distance between a radiating element of a radio antenna and a cover formed of a dielectric material.

In summary, one aspect of the present invention provides an apparatus comprising: a main housing accomodating system elements therein; an upper housing attached to the main housing; a radio antenna having a ground and a radiating element, wherein the radio antenna is movably attached to the upper housing; a cover formed of a dielectric material and arranged so as to cover the radio antenna; and an antenna distance setting mechanism, wherein the antenna distance setting mechanism sets a predetermined distance between the radiating element and an inner wall of the cover.

Another aspect of the present invention provides an apparatus comprising: an antenna distance setting mechanism which sets a predetermined distance between a radiating element of a radio antenna and an inner wall of a cover; wherein the radio antenna is pressed against the inner wall of the cover to the predetermined distance upon the radio antenna being covered with the cover.

A further aspect of the present invention provides an apparatus comprising: a display; and an antenna distance setting mechanism which sets a predetermined distance between a radiating element of a radio antenna and an inner wall of a cover, wherein the radio antenna is pressed against the inner wall of the cover to the predetermined distance upon the radio antenna being covered with the cover; and wherein the radio antenna is arranged within the display.

For a better understanding of the present invention, together with other and further features and advantages thereof, reference is made to the following description, taken in conjunction with the accompanying drawings, and the scope of the invention that will be pointed out in the appended claims.

DETAILED DESCRIPTION OF THE INVENTION

Figure 1:
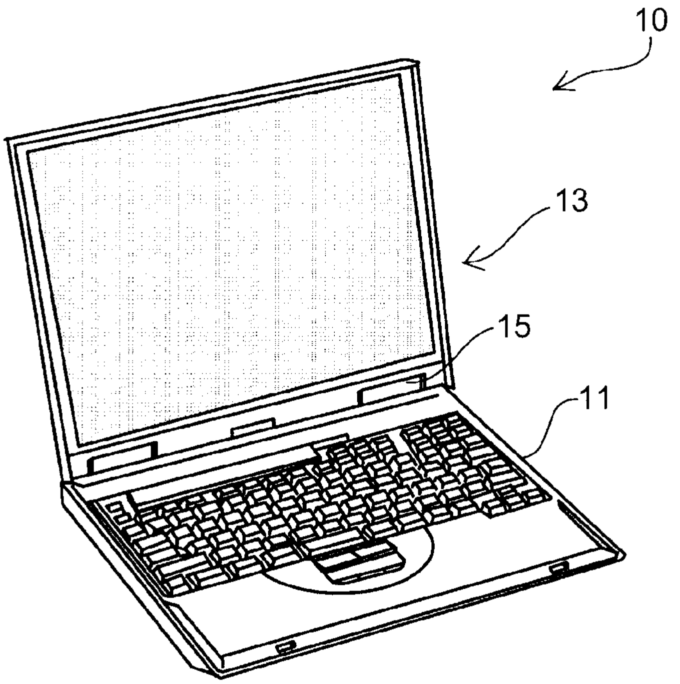
FIG. 1 is a perspective view illustrating the configuration of a notebook PC according to an embodiment of the present invention.

The disclosure will now provide a general overview of the invention followed by a more detailed description of the invention with reference to the Figures. It is to be understood that the present invention, in accordance with at least one presently preferred embodiment, as generally described and illustrated in the Figures herein, may be arranged and designed in a wide variety of different configurations. Thus, the following more detailed description of the embodiments of the present invention, as represented in the Figures, is not intended to limit the scope of the invention, as claimed, but is merely representative of selected embodiments of the invention.

Moreover, although illustrative embodiments of the present invention have been described herein with reference to the accompanying Figures, it is to be understood that the invention is not limited to those precise embodiments. Various other changes and modifications to embodiments may be affected therein by one skilled in the art without departing from the scope or spirit of the invention. Further, reference to "an" embodiment or "one" embodiment (or the like) throughout the disclosure does not necessarily refer to the same embodiment.

In an embodiment of the present invention, a radio antenna is movably attached to an upper housing, and a cosmetic cover formed of a dielectric material covers the radio antenna. The cosmetic cover and the radio antenna are attached to the upper housing in an assembly process. However, in the present invention, an antenna distance setting mechanism sets a distance between the radiating element and an inner wall of the cosmetic cover to a predetermined distance by moving the radio antenna when the cosmetic cover covers the radio antenna. Here, when 'the cosmetic cover covers the radio antenna' includes a period of time for which the cosmetic cover is completely attached to a portable computer and a time immediately after the attachment. The predetermined distance (set distance) also includes a case in which an actual distance is zero, that is, a surface of a radiating element and an inner wall of a cosmetic cover are in contact with each other. If the set distance is secured, the radio antenna can show a predetermined performance, such as a gain or a resonance frequency intended when manufactured.

If the radio antenna is manufactured so as to have a resonance frequency, which is requested to the portable computer, with respect to the set distance, deviation of resonance frequency can be prevented even if the antenna is attached to a main housing and covered by the cosmetic cover. The antenna distance setting mechanism may be configured such that a manual level is taken out to the surface of the cosmetic cover so as to be operated by a user. However, by adopting a structure in which setting to the set distance is made in conjunction with attachment of the cosmetic cover to the upper housing, assembly of a portable computer becomes easy and it is not necessary to take out an additional lever to the surface of the portable computer, which is advantageous in both design and cost.

The antenna distance setting mechanism may be configured to include an elastic member which applies an elastic force in the direction in which the radio antenna is pressed against the inner wall of the cosmetic cover. By pressing the radio antenna against the inner wall by means of the elastic force, the tolerance at the time of manufacturing and assembly of the cosmetic cover or the upper housing can be absorbed. As a result, the set distance can be reliably secured. In addition, even in connection with vibration or impact when a portable computer is carried, the set distance is reliably maintained. The antenna distance setting mechanism may be configured to include a stopper, which more protrudes toward the inner wall of the cosmetic cover than the radiating element does, and sets the distance between the radiating element and the inner wall of the cosmetic cover to the set distance by pressing the stopper against the inner wall of the cosmetic cover with an elastic force of the elastic member. By adopting such configuration, it is possible to secure the set distance without making the radiating element come in direct contact with the inner wall of the cosmetic cover. Accordingly, even if slight misalignment occurs between the upper housing and the cosmetic cover during use or the cosmetic cover is attached or detached, it is possible to prevent a surface of the radiating element from being damaged.

The antenna distance setting mechanism may be configured to include an antenna supporting member which is movably attached to a side surface of the upper housing, supports the radiating element, and is formed of a synthetic resin. In addition, if the antenna supporting member is formed in an arch shape such that a middle portion of the antenna supporting member bulges so as to be closer to the inner wall of the cosmetic cover than both ends are, the middle portion can be sufficiently pressed against the inner wall of the cosmetic cover even when an elastic force is applied to both the ends by the elastic member. Accordingly, since the antenna supporting member shows elasticity, the set distance can be reliably secured.

In a radio antenna in which a ground of the radio antenna is arranged along a bottom surface of the upper housing and the radiating element is bent approximately 90° from the ground so as to face the inner wall of the cosmetic cover, the setting mechanism can set the distance between the radiating element and the inner wall by sliding the ground along the plane of the upper housing. In the case of an inverted F-type antenna which is a radio antenna used in the wireless WAN, particularly delicate distance setting is required because a frequency is high, but it is possible to cope with this situation by using the antenna distance setting mechanism according to the present invention. Since the radio antenna and the cosmetic cover can be separated from each other, the cosmetic cover can be detachably attached to the upper housing. 'The cosmetic cover can be detachably attached to the upper housing' means that even a user can attach or detach the cosmetic cover without needing a special tool or skill for a screw, insertion, a latch, or the like.

In accordance with one embodiment of the present invention, it is possible to provide a portable computer capable of maintaining a performance of a radio antenna covered by a cosmetic cover formed of a dielectric material. Furthermore, in accordance with the present invention, it is possible to provide an antenna distance setting mechanism which sets a distance between a radiating element of a radio antenna and a cover formed of a dielectric material.

Referring now to the Figures, FIG. 1 is a perspective view illustrating the configuration of a notebook PC 10 according to an embodiment of the present invention. The notebook PC 10 is configured to include a main housing 11, which has a surface on which a keyboard and a pointing device are mounted and in which many kinds of systems and devices, such as a CPU, a mother board, a hard disk, and a wireless module, are accommodated, and a display-side unit 13 having a surface on which a liquid crystal display (LCD) is mounted. The display-side unit 13 is openably and closably attached to the main housing 11 through a connecting portion 15.

Figure 2:
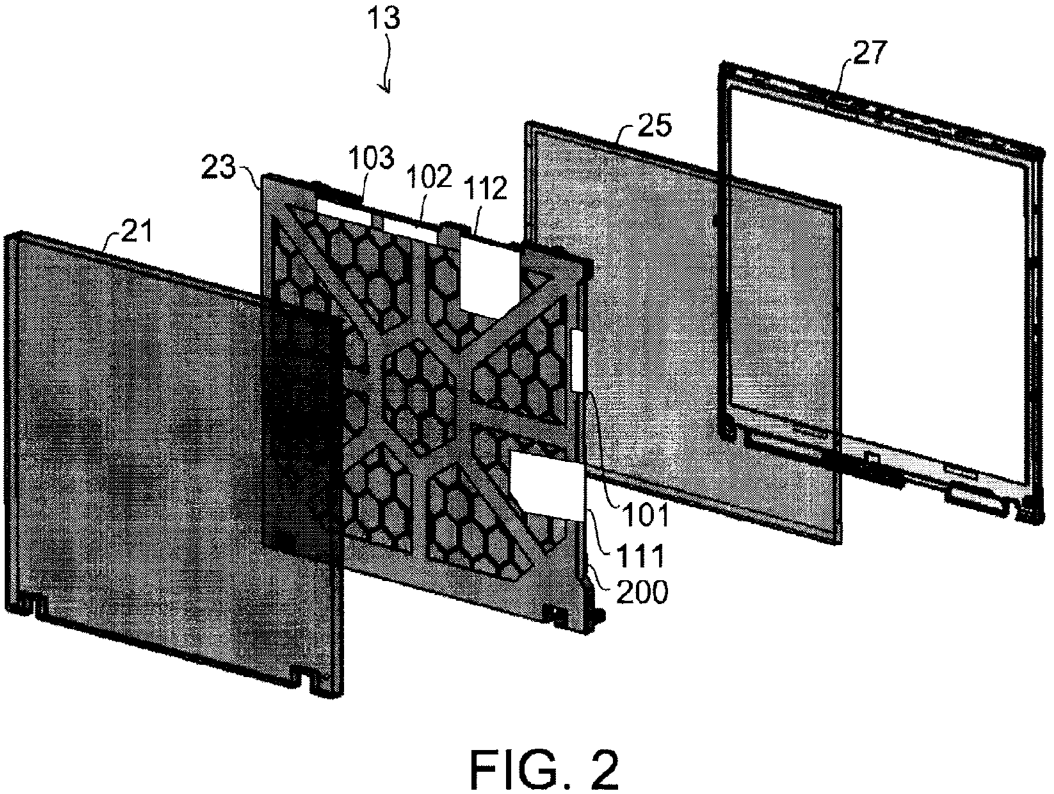
FIG. 2 is an exploded perspective view illustrating the configuration of a display-side unit.

FIG. 2 is an exploded perspective view illustrating the configuration of the display-side unit 13. The display-side unit 13 is configured to mainly include a cosmetic cover 21, an upper housing 23, a display module 25, and a bezel 27. The cosmetic cover 21 and the upper housing 23 are equivalent to a known display-side housing described in background art. The upper housing 23 functions as a structural member of the display-side unit 13 and is openably and closably attached to the main housing 11 (refer to FIG. 1) through the connecting portion 15. The upper housing 23 is molded in a structure obtained by combination of a plurality of ribs using die casting of magnesium or aluminum, for example, and is configured such that light weight and predetermined rigidity can be secured.

The upper housing 23 is molded in a box shape, and a display module 25 configured to include a liquid crystal module and a backlight is accommodated therein. An outer side of the upper housing 23 is in contact with an inner side of the cosmetic cover 21. The display module 25 is connected to a video card (not shown) accommodated inside the main housing 11. The notebook PC 10 supports two wireless communication standards of wireless LAN and wireless WAN, and a plurality of radio antennas 101 to 103, 111, and 112 which are used in the wireless LAN and the wireless WAN are attached to the upper housing 23.

The radio antennas 101 to 103 are antennas used in the wireless LAN, and all of the three radio antennas are used for an MIMO (multi input multi output) communication. In addition, the radio antennas 111 and 112 are antennas used in the wireless WAN, and the two radio antennas correspond to a diversity communication. Each of the radio antennas 101 and 111 is attached to the upper housing 23 through an antenna supporting member 200. The other radio antennas 102, 103, and 112 are directly attached to the upper housing 23.

In the present embodiment, the radio antenna 101 attached to the position corresponding to a side surface of the display-side unit 13 is used as a main radio antenna for a communication using a wireless LAN. Furthermore, the radio antenna 111 attached to the position corresponding to a side surface of the display-side unit 13 is used as a main radio antenna for a communication using a wireless WAN. The radio antennas 101 to 103, 111, and 112 are manufactured so as to operate at a resonance frequency which is requested, in the wireless WAN or the wireless LAN, for a set distance which is set beforehand as a distance between a radiating element and a dielectric material.

The cosmetic cover 21 is formed of plastics, such as a polycarbonate resin or an ABS resin. The cosmetic cover 21 is screwed to the upper housing 23 so as to cover the upper housing 23 which accommodates the display module 25 therein and to which the radio antennas 101 to 103, 111, and 112 are attached. The bezel 27 is arranged on a front surface of the display module 25 and is attached to the upper housing 23, thereby covering the periphery of the display module 25.

Figure 3:
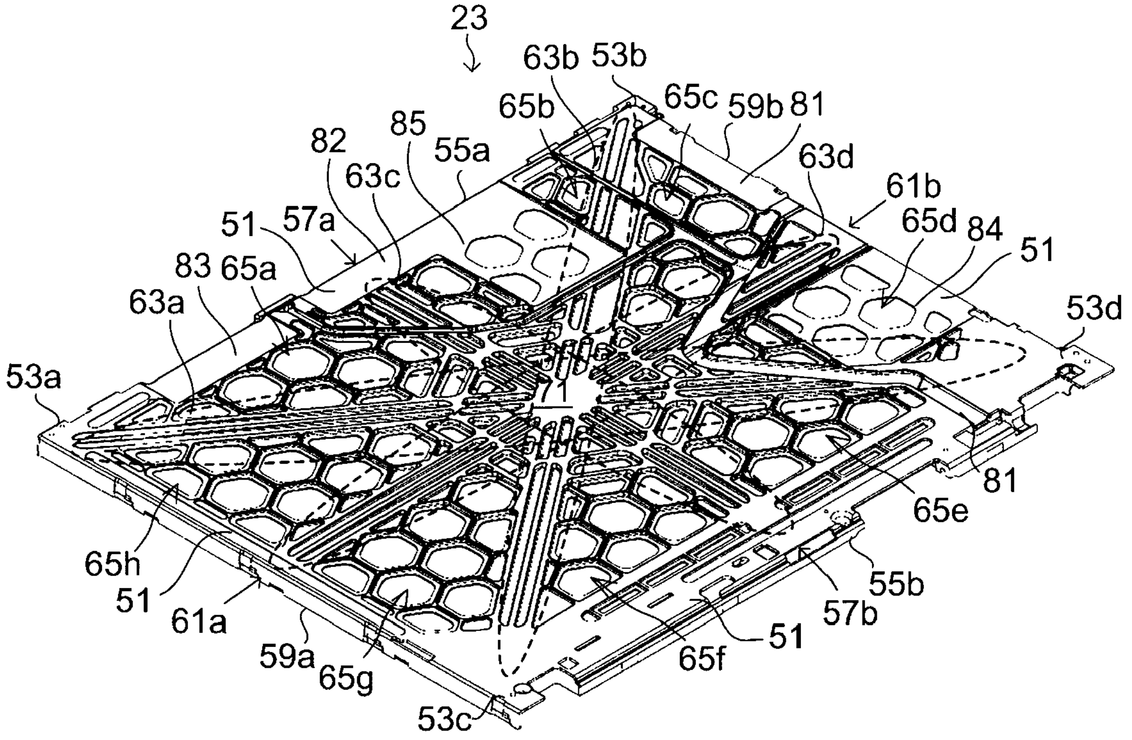
FIG. 3 is a perspective view illustrating the structure of an upper housing.

FIG. 3 is a perspective view illustrating the configuration of the upper housing 23 as viewed from a side of the cosmetic cover 21. The upper housing 23 is formed in a box shape such that the edge of a periphery 51, which has a shape in which an opening is formed inside a rectangular plate having a long side with a length of approximately 30 cm and a short side with a length of approximately 25 cm, is bent approximately 6 through 7 mm so as to accommodate the display module therein. One part and the other part of the periphery 51 are connected to each other by four main bridges 63*a* to 63*d* located in ranges indicated by dotted lines, respectively. The main bridges 63*a* to 63*d* are connected so as to be one body in a middle portion 71, such that the strength against pressure of the middle portion is increased.

In addition, sub-bridges 65*a* to 65*h* each having a honeycomb structure are formed in openings divided by the periphery 51 and the four main bridges 63*a* to 63*d*, respectively. The sub-bridges 65*a* to 65*h* are connected to the main bridges 63*a* to 63*d* and the periphery 51 and are provided in order to support the cosmetic cover 21 against the pressure. In the upper housing 23, a cable duct 81 through which cables connected to the radio antennas 101 to 103, 111, and 112 run is formed in a path which crosses the main bridges 63*a* to 63*d* and the sub-bridges 65*a* to 65*d* on the same plane.

The main bridge 63*a* is formed so as to connect corners 53*a* and 53*d* of the periphery 51 to each other. The main bridge 63*b* is formed so as to connect corners 53*b* and 53*c* to each other. The main bridge 63*c* is formed so as to connect positions 57*a* and 57*b* near midpoints of long sides 55*a* and 55*b* to each other. The main bridge 63*d* is formed so as to connect positions 61*a* and 61*b* near midpoints of short sides 59*a* and 59*b* to each other. A pressing force applied to the cosmetic cover 21 in a state where the notebook PC 10 is closed is transmitted from the main bridges 63*a* to 63*d* to the periphery 51. Moreover, the pressing force is also transmitted to the main housing 11 from the corners 53*a* to 53*d* of the periphery, the positions 57*a* and 57*b* near the midpoints of the long sides, and the positions 61*a* and 61*b* near the midpoints of the short sides. Antenna positions 81 to 83, 84, and 85 to which the radio antennas 101 to 103, 111, and 112 are attached are formed in the upper housing 23. The antenna positions 81 to 83, 84, and 85 are formed on a bottom surface of the upper housing 23, and a ground of each radio antenna is arranged in each of the antenna positions 81 to 83, 84, and 85.

Each of the radio antennas 101 to 103, 111, and 112 is configured to include a ground, which is arranged along the bottom surface of the upper housing 23 and has a large-area region, and a radiating element formed so as to be bent approximately 90° with respect to the ground. Since the antennas 101 and 111 are main antennas, particularly excellent characteristics are requested. Accordingly, an antenna distance setting mechanism which sets a distance between radiating elements of the radio antennas 101 and 111 and an inner wall of a cosmetic cover to the set distance after assembly is provided in the notebook PC 10.

Figure 4A:
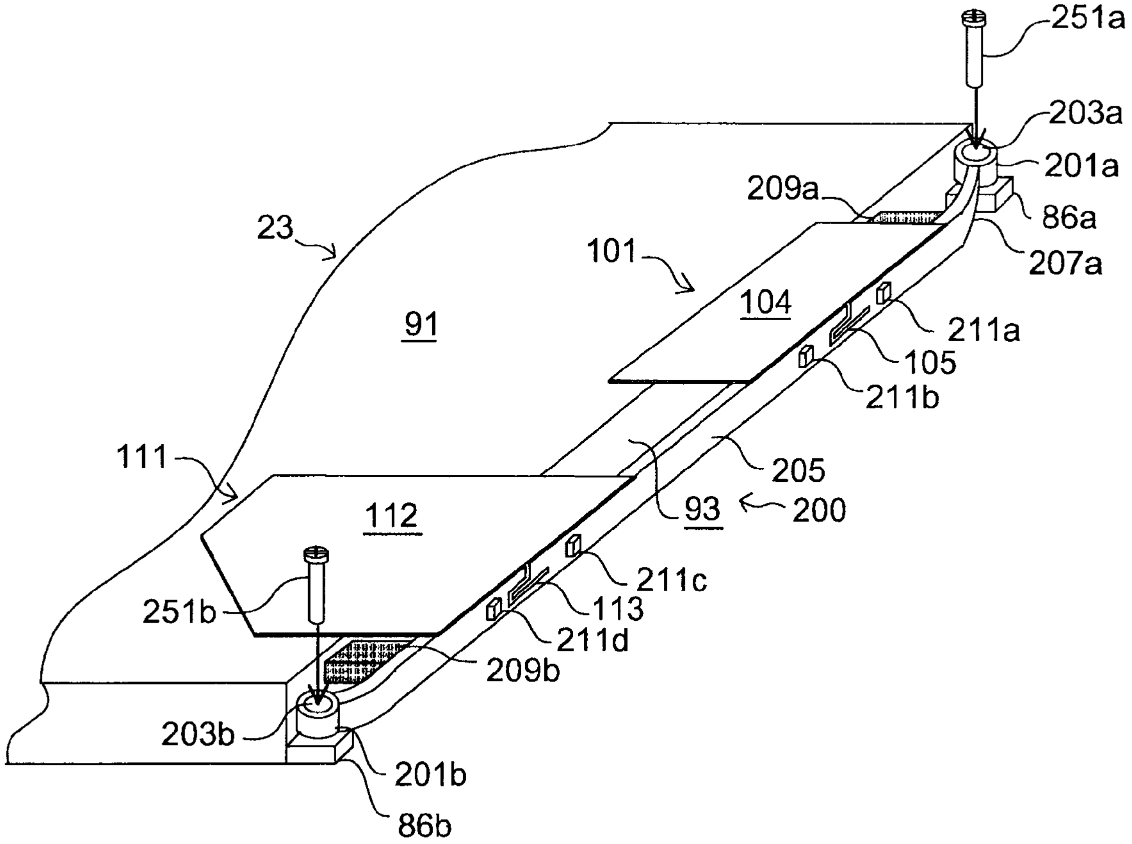
FIG. 4A is a perspective view illustrating the configuration of an antenna distance setting mechanism.
Figure 4B:
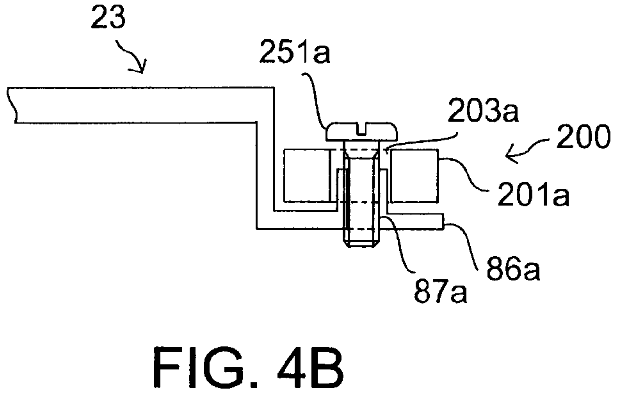
FIG. 4B is a cross-sectional view illustrating the configuration of the antenna distance setting mechanism.

FIG. 4A is a perspective view illustrating an antenna distance setting mechanism, and FIG. 4B is a cross-sectional view illustrating a screw 251*a* and the periphery at the position cut in the longitudinal direction. Since the radio antennas 101 and 111 are used as main antennas of wireless LAN and wireless WAN, respectively, it is necessary to strictly maintain a resonance frequency, a gain, or the like. For this reason, a distance between a radiating element and an inner wall is made to be maintained at a set distance by the antenna distance setting mechanism. An antenna supporting member 200 is integrally molded using a synthetic resin and is arranged along a side surface 93 of the upper housing 23. Fixing holes 203*a* and 203*b* used to attach the antenna supporting member 200 to the upper housing 23 are formed in ends 201*a* and 201*b* located at both ends of a body 205 of the antenna supporting member 200. In addition, the antenna supporting member 200 is attached to fixed portions 86*a* and 86*b*, which are a part of the upper housings 23, with screws 251*a* and 251*b*. The attachment structures using the screws 251*a* and 251*b* are equal to each other.

As shown in the attachment structure using the screw 251*a* of FIG. 4B, the screw 251*a* passing through the fixing hole 203*a* is attached to a screw hole 87*a* which is tapped in a boss of the fixed portion 86*a* formed on the side surface 93 of the upper housing 23. The opening of the fixing hole 203*a* has a long hole shape. The length of the screw 251*a* is larger than the thickness of the end 201*a*, and accordingly, the antenna supporting member 200 is not fixed to the fixed portions 86*a* and 86*b* even if the screws 251*a* and 251*b* are tightened completely. Thus, the ends 201*a* and 201*b* are not completely fixed to the upper housing 23 but are attached to the upper housing 23 so as not to be detached from the upper housing 23, such that the ends 201*a* and 201*b* can move in the direction perpendicular to the side surface 93 within a range allowed by the fixing holes 203*a* and 203*b* and the screws 251*a* and 251*b*.

The body 205 of the antenna supporting member 200 is formed in an arch shape in which a middle portion bulges toward an outer side (inner wall side of the cosmetic cover) compared with the ends 201*a* and 201*b*. Protrusions 211*a* to 211*d* are formed in the body 205 so as to face the inner wall of the cosmetic cover 21. Front ends of the protrusions 211*a* to 211*d* are located on approximately the same plane and more protrude from the body 205 than surfaces of the radiating elements 105 and 113. The protrusions 211*a* and 211*b* are arranged at both sides of the radiating element 105, and the protrusions 211*c* and 211*d* are arranged at both sides of the radiating element 113. Between the body 205 and the side surface 93 of the upper housing 23, elastic members 209*a* and 209*b* formed of rubber or urethane are provided near the ends 201*a* and 201*b*. The elastic members 209*a* and 209*b* can be fixed to the body 205 or the side surface 93 with an adhesive. The elastic members 209*a* and 209*b* are configured to apply an elastic force to the antenna supporting member 200 if the protrusions 211*a* to 211*d* are pressed against the inner wall of the cosmetic cover 21 and are compressed by the body 205 and the side surface 93 when the antenna supporting member 200 is attached to the cosmetic cover 21.

The radio antennas 101 and 111 are configured to include radiating elements 105 and 113 and grounds 104 and 112, respectively. The radiating elements 105 and 113 of the radio antennas 101 and 111 are attached to the body 205 with an adhesive so as to be parallel to the side surface 93 of the upper housing 23. In addition, although the lengths of the radiating elements 105 and 113 are practically different due to a difference between resonance frequencies, the radiating elements 105 and 113 are simplified when described in the drawing. The grounds 104 and 112 are arranged along a bottom surface 91 of the upper housing 23 but not fixed thereto, and the grounds 104 and 112 are connected to the radiating elements 105 and 113. Thus, the grounds 104 and 112 are configured in a structure in which the grounds 104 and 112 slide along the bottom surface 91 with the movement of the antenna supporting member 200. The antennas 101 and 111 are manufactured by performing punching processing on a metal plate such that the radiating elements 105 and 113 are formed in ends and the remaining parts serve as the grounds 104 and 112. The radio antennas 101 and 111 are bent approximately 90° at boundaries between the radiating elements 105 and 113 and the grounds 104 and 112, respectively.

Each of the radio antennas 101 and 111 is formed as an inverted F-type antenna resonating at a ¼ wavelength of a resonance frequency, and the radiating element and the ground of each of the radio antennas 101 and 111 are connected to a common ground and a wireless module accommodated in the main housing 11 by cables running through the cable duct 81 shown in FIG. 3. The present invention may also be applied to antennas having other structures, such as an inverted L-type antenna and a loop antenna.

Figure 5:
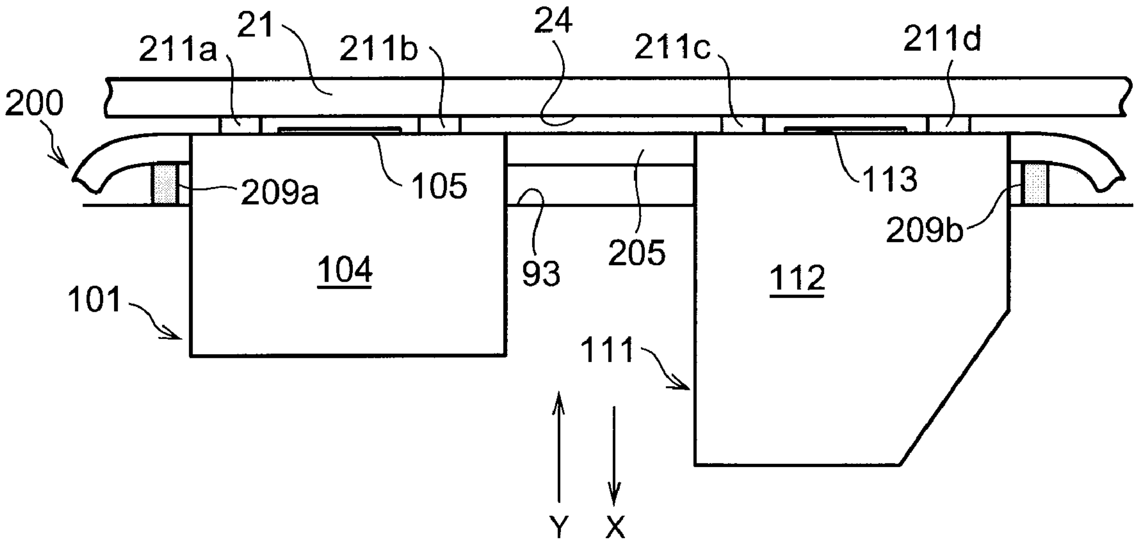
FIG. 5 is a view illustrating how an antenna distance setting mechanism sets a distance between a radio antenna and an inner wall of a cosmetic cover.

FIG. 5 is a view illustrating how the antenna distance setting mechanism sets a distance between an inner wall 24 of the cosmetic cover 21 and the radiating elements 105 and 113. FIG. 5 is a plan view illustrating a state of a bottom surface of the upper housing 23 when the cosmetic cover 21 is attached to the upper housing 23 to which the radio antennas 101 and 111 are attached. Before the cosmetic cover 21 is attached, the body 205 of the antenna supporting member 200 is pushed and stopped up to the limit allowed by the fixing holes 203*a* and 203*b* in the arrow Y direction, which is perpendicular to the inner wall 24 of the cosmetic cover 21, by an elastic force which is applied by the elastic members 209*a* and 209*b*.

Then, the cosmetic cover 21 is fixed to a predetermined position of the upper housing 23 with a screw while making the inner wall 24 of the cosmetic cover 21 come in contact with front ends of the protrusions 211*a* to 211*d*. At this time, the inner wall 24 pushes the protrusions 211*a* to 211*d* against an elastic force of the elastic members 209*a* and 209*b* in the arrow X direction perpendicular to the inner wall. The size and positional relationship of each component are determined such that the elastic members 209*a* and 209*b* apply an elastic force in the arrow Y direction to the antenna supporting member 200 even when the cosmetic cover 21 is fixed to the upper housing 23 with a screw. Accordingly, since the protrusions 211*a* to 211*d* are maintained in a state where front ends of the protrusions 211*a* to 211*d* are in contact with the inner wall 24, a distance between a surface of the radiating elements 105 and 113 and the inner wall 24 becomes a value determined by the height from the body 205 of the radiating elements 105 and 113 and the protrusions 211*a* to 211*d*.

The antenna supporting member 200 is formed in an arch shape such that a middle portion thereof is closer to the inner wall 24 than the ends 201*a* and 201*b* are. Accordingly, even when an elastic force is applied to the antenna supporting member 200 in the neighborhood of the ends 201*a* and 201*b* by means of the elastic members 209*a* and 209*b*, the antenna supporting member 200 elastically deforms while being adapted to the plane of the inner wall 24. As a result, the distance between the body 205 and the inner wall 24 can be maintained at a set distance over the entire longitudinal direction of the body 205.

Since tolerance of the protrusions 211*a* to 211*d* and the radiating elements 105 and 113 with respect to the height from the body can be made sufficiently smaller than attachment tolerance of the cosmetic cover 21 with respect to the upper housing 23, a set distance which is set when manufacturing a radio antenna can be substantially secured. The protrusions 211*a* to 211*b* may be formed in the inner wall 24 of the cosmetic cover 21 instead of the antenna supporting member 200. A space is provided between the radiating elements 105 and 113 and the inner wall 24 in a state where the cosmetic cover 21 is attached to the upper housing 23. Accordingly, even if the cosmetic cover 21 is frequently detached, a case in which the inner wall 24 comes in contact with the surface of the radiating elements 105 and 113 to thereby damage the radiating elements does not occur.

As described heretobefore, the radio antenna 101 is used as a main antenna in the wireless LAN and the radio antenna 111 is used as a main antenna in the wireless WAN. Accordingly, in the present embodiment, an antenna distance setting mechanism for the other radio antennas 102, 103, and 112 is not provided. However, an antenna distance setting mechanism may also be provided for those radio antennas in order to improve the antenna characteristics. In the present embodiment, the antennas 101 and 111 are attached to the antenna supporting member 200 and both set distances are set to have the same value. However, within the range of the present invention, it is also possible to provide a step difference in the body 205 of the antenna supporting member 200 so that the set distances with respect to the inner wall 24 are different from each other. In this manner, a degree of freedom when manufacturing a radio antenna can be increased.

The configuration of the above-described antenna distance setting mechanism can be applied to not only a notebook PC but also all kinds of electronic devices having radio antennas mounted therein. For example, the above-described structure may also be applied to a tablet computer, a PDA, a mobile phone, or a game machine in which both a liquid crystal display and an electronic circuit are mounted in one housing. In addition, communication standards to which the present invention can be applied are not limited to the wireless LAN or the wireless WAN. For example, the present invention may also be applied to a wireless USB or a radio antenna for BLUETOOTH® devices. In addition, since the mechanism which sets the distance between the radio antenna and the inner wall of the cosmetic cover in the present invention causes a radio antenna not to be damaged even if a cosmetic cover is repeatedly attached and detached, a user may replace a cosmetic cover by attaching and detaching a plurality of kinds of cosmetic covers such that a color or tactile feeling can be selected by user's liking.

While the present invention has been described with reference to the specific embodiment shown in the drawings, it is needless to say that the present invention is not limited to the embodiment described in the drawings but known configurations may also be adopted as long as the effects of the present invention are obtained.

The above-described antenna distance setting mechanism can be used in an electronic device in which a radio antenna covered by a cosmetic cover formed of a dielectric material is mounted.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus comprising:

a main housing accomodating system elements therein;

an upper housing attached to the main housing;

a radio antenna having a ground and a radiating element, wherein the radio antenna is movably attached to the upper housing;

a cover formed of a dielectric material and arranged so as to cover the radio antenna; and an antenna distance setting mechanism, wherein the antenna distance setting mechanism sets a predetermined distance between the radiating element and an inner wall of the cover.

2. The apparatus according to claim 1, wherein the radio antenna has a requested resonance frequency when the radio antenna is arranged at the predetermined distance from a dielectric material.

3. The apparatus according to claim 1, wherein the antenna distance setting mechanism sets a distance between the radiating element and the inner wall of the cover to the predetermined distance in conjunction with attachment of the cover to the upper housing.

4. The apparatus according to claim 1, wherein the antenna distance setting mechanism includes an elastic member which applies an elastic force in the direction in which the radio antenna is pressed against the inner wall of the cover.

5. The apparatus according to claim 4, wherein the antenna distance setting mechanism includes a stopper, wherein the stopper protrudes more toward the inner wall of the cover than the radiating element and sets the predetermined distance between the radiating element and the inner wall of the cover upon pressing the stopper against the inner wall of the cover with the elastic force of the elastic member.

6. The apparatus according to claim 4, wherein the antenna distance setting mechanism includes an antenna supporting member having a first end, a second end and a middle portion, and further wherein the antenna supporting member supports the radio antenna and is movably attached to a side surface of the upper housing.

7. The apparatus according to claim 6 wherein the antenna supporting member is formed of a synthetic resin and has elasticity at both ends thereof, and further wherein the middle portion of the antenna supporting member bulges so as to be closer to the inner wall of the cover than both of the ends.

8. The apparatus according to claim 4, wherein the ground is arranged along a bottom surface of the upper housing;

wherein the radiating element is bent approximately 90° from the ground; and wherein the antenna distance setting mechanism sets the predetermined distance between by sliding the ground along the bottom surface of the upper housing.

9. The apparatus according to claim 1, wherein the radio antenna is an inverted F-type antenna used in a wireless WAN.

10. The apparatus according to claim 1, wherein the upper housing is formed of metal, and further wherein the cosmetic cover is detachably attached to the upper housing.

11. An apparatus comprising:

an antenna distance setting mechanism which sets a predetermined distance between a radiating element of a radio antenna and an inner wall of a cover;

wherein the radio antenna is pressed against the inner wall of the cover to the predetermined distance upon the radio antenna being covered with the cover.

12. The apparatus according to claim 11, wherein the radio antenna has a requested resonance frequency when the radio antenna is arranged at the predetermined distance from a dielectric material of the cover.

13. The apparatus according to claim 11, wherein the antenna distance setting mechanism sets a distance between the radiating element and the inner wall of the cover to the predetermined distance in conjunction with attachment of the cover to an upper housing of a computer.

14. The apparatus according to claim 11, wherein the antenna distance setting mechanism includes an elastic member that applies an elastic force in the direction in which the radio antenna is pressed against the inner wall of the cover.

15. The apparatus according to claim 14, wherein the antenna distance setting mechanism includes a stopper, wherein the stopper protrudes more toward the inner wall of the cover than the radiating element and sets the predetermined distance between the radiating element and the inner wall of the cover upon pressing the stopper against the inner wall of the cover with the elastic force of the elastic member.

16. The apparatus according to claim 14, wherein the antenna distance setting mechanism includes an antenna supporting member having a first end, a second end and a middle portion, and further wherein the antenna supporting member supports the radio antenna and is movably attached to a side surface of the upper housing.

17. The apparatus according to claim 16, wherein the antenna supporting member is formed of a synthetic resin and has elasticity at both ends thereof, and further wherein the middle portion of the antenna supporting member bulges so as to be closer to the inner wall of the cover than both of the ends.

18. The apparatus according to claim 10, wherein the radio antenna is an inverted F-type antenna used in a wireless WAN.

19. The apparatus according to claim 10, wherein the upper housing is formed of metal, and further wherein the cosmetic cover is detachably attached to the upper housing.

20. An apparatus comprising:

a display; and an antenna distance setting mechanism which sets a predetermined distance between a radiating element of a radio antenna and an inner wall of a cover, wherein the radio antenna is pressed against the inner wall of the cover to the predetermined distance upon the radio antenna being covered with the cover; and wherein the radio antenna is arranged within the display.

* * * * *